United States Patent
Bigiavi et al.

(10) Patent No.: US 7,199,163 B2
(45) Date of Patent: Apr. 3, 2007

(54) METHOD FOR REMOVING VOLATILE COMPONENTS FROM POLYMER COMPOSITIONS

(75) Inventors: Daniele Bigiavi, Bologna (IT); Nicolò Arich De Finetti, Ferrara (IT); Gabriele Mei, Ferrara (IT); Guiseppe Penzo, Mantova (IT); Massimo Covezzi, Ferrara (IT); Pietro Baita, S. Maria Maddalena-Rovigo (IT); Maria Silvia Tonti, Ferrara (IT)

(73) Assignee: Basell Poliolefine Italia S.p.A., Milan (IT)

(*) Notice: Subject to any disclaimer, the term of this patent is extended or adjusted under 35 U.S.C. 154(b) by 0 days.

(21) Appl. No.: 10/518,693

(22) PCT Filed: Jun. 17, 2003

(86) PCT No.: PCT/EP03/06351

§ 371 (c)(1),
(2), (4) Date: Dec. 16, 2004

(87) PCT Pub. No.: WO04/000891

PCT Pub. Date: Dec. 31, 2003

(65) Prior Publication Data

US 2005/0234217 A1 Oct. 20, 2005

Related U.S. Application Data

(60) Provisional application No. 60/408,197, filed on Sep. 4, 2002.

(30) Foreign Application Priority Data

Jun. 24, 2002 (EP) .................. 02077544
Feb. 11, 2003 (EP) .................. 03075397

(51) Int. Cl.
*C08G 6/00* (2006.01)
(52) U.S. Cl. .............. 518/480; 526/127; 528/481; 585/329
(58) Field of Classification Search ............ 526/127; 528/480, 481; 585/329
See application file for complete search history.

(56) References Cited

U.S. PATENT DOCUMENTS

| | | | |
|---|---|---|---|
| 5,237,048 A | 8/1993 | Miyakawa et al. | 528/483 |
| 5,380,822 A | 1/1995 | Skilbeck | 528/499 |
| 5,691,445 A | 11/1997 | Krupinski et al. | 528/483 |
| 5,804,676 A * | 9/1998 | Hieda et al. | 526/65 |

FOREIGN PATENT DOCUMENTS

| | | |
|---|---|---|
| EP | 1201682 | 5/2002 |
| GB | 0894862 | 4/1962 |

* cited by examiner

*Primary Examiner*—Terressa Boykin
(74) *Attorney, Agent, or Firm*—William R Reid

(57) ABSTRACT

Method for continuously removing the unreacted butene-1, and optionally other volatile components, from a polymeric solution obtained by liquid phase (co)polymerization of butene-1, the method comprising the steps of: subjecting the polymeric solution to heating and mixing conditions such that a mixture is formed consisting substantially of: (1) a polybutene melt containing entrapped butene-1 and (2) supercritical gaseous butene-1; subjecting the above mixture to a sequence of devolatilization steps operating at decreasing pressures.

29 Claims, 2 Drawing Sheets

METHOD FOR REMOVING VOLATILE COMPONENTS FROM POLYMER COMPOSITIONS

This application is the U.S. national phase of International Application PCT/EP2003/006351, filed Jun. 17, 2003, claiming priority to European Patent Application 02077544.1 filed Jun. 24, 2002, and European Patent Application 03075397.4 filed Feb. 11, 2003, and the benefit under 35 U.S.C. 119(e) of U.S. Provisional Application No. 60/408,197, filed Sep. 4, 2002; the disclosures of International Application PCT/EP2003/006351, European Patent Application 02077544.1, European Patent Application 03075397.4 and U.S. Provisional Application No. 60/408,197, each as filed, are incorporated herein by reference.

The present invention relates to the removal of volatile components from a polymeric composition. In particular, the present invention relates to a method for preparing butene-1 polymers having a low content of monomer by melt devolatilization of a polymeric solution obtained by liquid-phase polymerization of butene-1.

Butene-1 (co)polymers are well known in the art and are mainly used in the manufacture of molded products such as pipes, packaging films, adhesives.

Hitherto, butene-1 (co)polymers have been mainly produced by solution polymerization and slurry polymerization in the presence of coordination catalysts which are generally referred to as Ziegler-Natta catalysts. When a solution process is adopted, the polymerization is preferably carried out in liquid butene-1 at conditions under which a solution of polybutene in butene-1 is discharged from the polymerization reactor. When a slurry polymerization is adopted, the polymerization is carried out in liquid butene-1 at conditions under which the polymer is produced as a solid, thus obtaining a slurry of solid polymer in butene-1. In both cases, an additional step is required wherein the unreacted monomer is removed from the obtained polybutene-1.

In the art of the removal of volatile components from a polymerization fluid composition there are a number of well-known methods for reducing the volatile content of the resulting polymer composition as much as possible. These methods are mostly used for the continuous removal of volatile components from vinyl aromatic- or styrene-based polymers and involve heating the polymerization fluid composition containing volatile components to high temperatures, in the range of 150–250° C., and then flashing it in a devolatilization chamber. The extent of separation can be improved by raising the temperature at which the polymeric composition is introduced inside the devolatilization chamber or, in alternative, by decreasing the pressure in the volatilizer up to vacuum conditions.

Both the methods cannot be exploited to the fullest extent. On the one hand, as the temperature of the polymerization fluid composition is increased, the residual monomers can polymerize. Said further and uncontrolled polymerization occurring during the heating phase would lead to an undesired modification of the final properties of the obtained polymer pellets. Moreover, the temperature must not exceed the limit at which phenomena of thermal degradation of the polymer chains occur.

On the other hand, enhancement of the degree of vacuum in the devolatilization chamber involves a marked increase in the volume of the separated gas, causing a considerable growth of the pressure drop within the piping. As a consequence, in the monomer recovery section the diameter of pipes as well as the size of the condenser must be increased with a consequent growth of the construction costs. A high degree of vacuum also causes a lowering of the dew point of the monomer so that the condensation of the monomer along the recycle line must be operated at very low temperatures, and this brings about additional operating costs.

In view of the above limits, it is extremely difficult to reduce the content of the volatile components, such as unreacted monomers, solvents, chain-transfer agents in a polymer composition to a sufficiently low level. For this reason, the use of an extruder endowed with vent openings, placed at the outlet of the devolatilization chamber, was adopted with the aim of reducing the volatile components remaining in the polymer to the fullest extent. However, the additional use of a vented extruder causes an increase in equipment and power costs, resulting in increased production costs.

Another type of devolatilization known in the art is carried out by means of suitable stripping agents, such as steam, $CO_2$, $N_2$, etc. As an example thereof, U.S. Pat. No. 5,380,822 discloses a process for reducing the amount of residual monomer, dimer, trimer and solvent to less than 500 parts per million in a polymer or a polymer blend containing less than 2% weight of such residual monomer. The process comprises (i) heating said polymer at a temperature from 200–270° C., (ii) injecting into said polymer an amount of water greater than the amount of residual monomer, dimer, trimer and solvent but less than 10% weight, (iii) passing said polymer through a flash chamber devolatilizer maintained at a temperature from 200–270° C. and a pressure lower than 8 torr.

U.S. Pat. No. 5,691,445 relates to a process for reducing the amount of residual monomer and solvent to less than 300 parts per million in a polymer or polymer blend of vinyl aromatic monomers, the process being characterized in that the devolatilization is fostered by the injection into the polymer melt of a suitable amount of $CO_2$.

The methods disclosed in U.S. Pat. Nos. 5,380,822 and 5,691,445 are not applicable to a polymeric solution obtained from a liquid phase polymerization of butene-1. In fact, the above stripping agents are not easily separable from the unreacted monomer when butene-1 has to be continuously recovered and recycled to the polymerization reactor. In fact, conventional distillation units are not sufficient to achieve an acceptable separation and molecular sieves must be provided in order to complete efficiently the separation. The use of molecular sieves increases the complexity of the process and the operative costs in the recovery section.

In view of the above drawbacks, it would be desirable to provide a method for continuously removing, with a high efficiency, the unreacted butene-1 contained in a polymeric solution obtained by liquid polymerization of butene-1.

The Applicant has surprisingly found that if a solution of polybutene in butene-1 is subjected to particular heating and devolatilization conditions, the above separation is achieved with a high efficiency, thus minimizing the content of butene-1 in the final polybutene-1 up to less than 100 ppm.

It is therefore an object of the present invention a method for continuously removing unreacted monomer, and optionally other volatile components, from a polymeric solution obtained by a liquid-phase (co)polymerization of butene-1, the method comprising the steps of:

a) subjecting the solution of polybutene in butene-1 to heating and mixing conditions such that a two-phase mixture is formed consisting substantially of: (1) a polybutene melt containing entrapped butene-1 and (2) supercritical gaseous butene-1;

b) subjecting the above mixture to a sequence of devolatilization steps operating at decreasing pressures and at temperatures comprised between 170 and 220° C.

Besides butene-1, other volatile components to be removed are for instance comonomers, dimers, inert hydrocarbons, catalyst components and catalyst deactivators.

Figure 1:
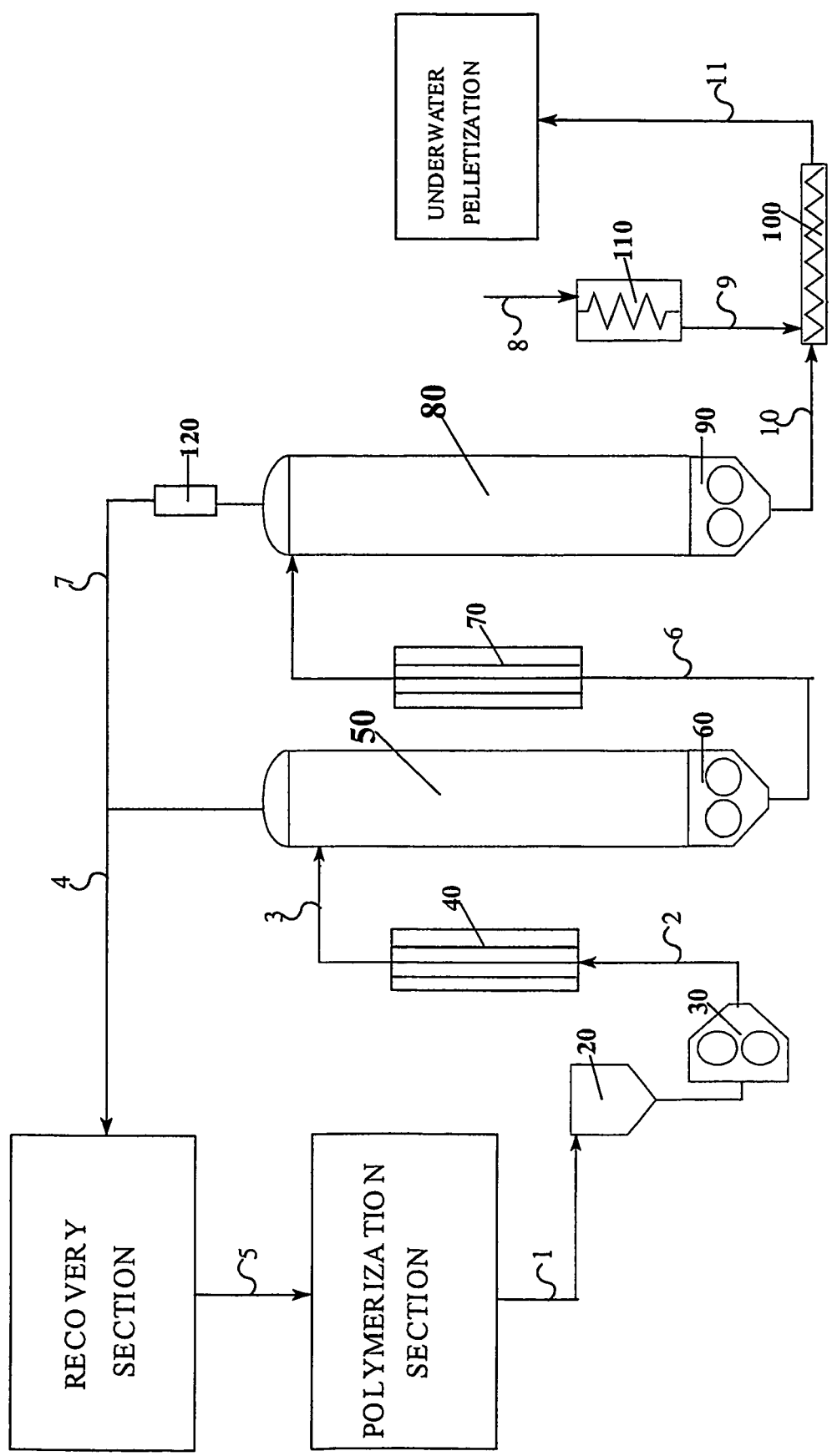
FIG. 1 is a process flow diagram of a process for removing volatile components from polymer compositions with a single heating step before the first devolatilization chamber.

The liquid-phase polymerization of butene-1 can take place in the presence or absence of an inert hydrocarbon solvent. Suitable solvents can be liquid hydrocarbons having 5 to 10 carbon atoms, such as pentane, hexane, heptane, octane, etc. Preferably liquid butene-1 is used as the reaction medium and the bulk polymerization leads to the formation of a single liquid phase comprising a solution of polybutene-1 in butene-1.

A highly active catalyst of the Ziegler-Natta or metallocene type can be used in the liquid-phase polymerization of butene-1. In order to obtain the best performance of the catalyst together with a complete miscibility of monomer and polymer, the polymerization temperature is generally kept at a value comprised in the range of from 65 to 85° C., while the pressure is generally comprised between 8 and 40 bar. As regards the comonomers, the polymerization can be carried out in the presence of up to 20% by weight based on butene-1 of another $\alpha$-olefin: suitable comonomers are, for instance, ethylene, propylene, pentene-1 and hexene-1.

It is preferred to carry out the polymerization under such conditions that the concentration of polybutene-1 in the reaction medium does not become unduly high, as otherwise the polymeric solution will become too viscous and difficult to stir and/or process. Therefore, the polymerization is preferably conducted in such a way that the concentration of polybutene-1 in butene-1 is comprised between 10 and 35% by weight, more preferably between 20 and 30% by weight. As a consequence, a large amount of unreacted monomer, comprised between 65 and 90% by weight, has to be removed in order to obtain final polybutenes-1 with a low content of entrapped monomer.

Before carrying out the method for removal of volatile components according to the present invention wherein high temperatures of about 170–220° C. are involved, the solution of polybutene-1 (PB-1) in butene-1 is generally subjected to a deactivation step of the catalyst residues. This avoids a further uncontrolled polymerization or a thermal degradation of the polymer in step a) and b) of the present invention. The deactivation can be achieved in one or more mixing tanks placed in series or, alternatively, in a single deactivation apparatus equipped with a sequence of more mixing stages. In the case of polymerization carried out in the presence of a Ziegler-Natta catalyst, any of the deactivating compounds known in the art can be employed. Suitable deactivating compounds are the organic compounds having a boiling point higher than 150° C. and at least a hydroxy group. In particular, the organic compounds characterized by a ratio between the molecular weight (MW) and the number of hydroxy groups (OH) comprised between 20 and 100. Examples of deactivating compounds satisfying the above requirements are propylen glycol, dipropylen glycol, glycerol.

In light of the above polymerization conditions, the polymeric solution fed to step a) is a highly-viscous polymeric solution of polybutene-1 in butene-1 having a temperature comprised between 65 and 85° C.

The heating and mixing conditions of step a) must take into account the high viscosity, of about $10^3$–$10^5$ cP, of the solution to be treated. Furthermore, the operative conditions of step a) must be accurately selected in order to cause the passage from a single liquid phase, i.e. a solution of PB-1 in butene-1, to a two-phase mixture consisting substantially of (1) a polybutene melt containing entrapped butene-1 and (2) supercritical gaseous butene-1. The amount of butene-1 entrapped into the polybutene melt is generally less than 10% by weight, preferably less than 6% by wt.

With the term of "polybutene-1 melt" is intended polybutene in the molten state: in spite of its very high viscosity (of about $20 \times 10^6$ cP) is still able to flow as a fluid inside pipes and similar. In view of the particular polybutene/butene-1 phase equilibrium, the following conditions have to satisfied in step a):

(I) The separation of partially-solid polymer should be accurately prevented during step a) to avoid the clogging of the apparatus employed to carry out the mixing and heating conditions of step a). In fact, a partially-solid polymer obstructs the flowability into the apparatus: even if re-molten by the high temperatures adopted in step a), a continuos solidification and re-melting of the polymer causes an unstable working of the apparatus and unexpected fluctuations of temperature and pressure. The Applicant has found that this drawback can be avoided by feeding the polymeric solution to the heating step a) at a pressure of not less than 22 bar, preferably in the range of from 25 to 80 bar. A pump for high viscosity fluids, such as a gear pump or a screw pump, can be placed on the line connecting the polymerization reactor to the heating and mixing step a) in order to provide the polymeric solution with the requested value of pressure.

(II) The temperature of the two-phase mixture obtained at the outlet of step a) should suitably be set at values such to substantially avoid during step b) the following drawbacks:
   a thermal degradation of the polymer chains due to high temperatures and/or
   the separation of a polybutene melt excessively viscous which cannot prime any pump.

In order to satisfy the above requirement (II), the temperature of the two-phase mixture obtained from step a) and fed to the sequence of devolatilization steps b) is set in the range from 170 to 220° C.

According to a first embodiment of the present invention, the heating and mixing conditions of step a) are obtained by flowing the solution of polybutene in butene-1 through a multi-tube heat exchanger having static mixing elements inserted inside each tube. The presence of a plurality of static mixing elements inside each tube is aimed to achieve an intense mixing of the highly-viscous solution and to prevent channeling. In fact, said elements cause mixing between the outermost and the innermost veins of the flowing stream so favoring a good heat transfer between the different threads of fluid. As a consequence, a two-phase mixture having a homogenous distribution of temperature is obtained at the outlet of step a). Preferably, mixing rods are used as static elements inserted into the tubes of the heat exchanger. Within each tube they cause splitting of the flowing stream, changing of the direction of flow and joining of the split streams.

According to a second and alternative embodiment of the present invention, the heating and mixing conditions of step a) can be carried out in two sequential steps. In a first step the polymeric solution of PB-1 in butene-1 is subjected to heating and mixing conditions in order to cause a separation of mostly pure butene-1 from the polymeric solution. The product obtained from the first step is then fed to a successive heating step so as to obtain a mixture consisting of (1) a polybutene melt containing entrapped butene-1 and (2) supercritical gaseous butene-1.

The above split in a sequence of two heating steps allows to carry out step a) with the advantages of minimizing any undesirable fluctuation of temperature and pressure as well as the risk of polymer deposition on the walls of the heating equipment.

Therefore, a second object of the present invention is a method for continuously removing unreacted monomer, and optionally other volatile components, from a polymeric solution obtained by a liquid-phase (co)polymerization of butene-1, the method comprising the steps of:

$a_1$) subjecting the polymeric solution to heating and mixing conditions so as to cause part of the butene-1 to separate from the solution;

$a_2$) subjecting the product obtained from step $a_1$) to a further heating such that a two-phase mixture is formed consisting substantially of: (1) a polybutene melt containing entrapped butene-1 and (2) supercritical gaseous butene-1;

b) subjecting the above two-phase mixture to a sequence of devolatilization steps operating at decreasing pressures and at temperatures comprised between 170 and 220° C.

In step $a_1$) the polymeric solution of PB-1 in butene-1 is pre-heated so as to cause a concentration thereof and a separation of mostly pure butene-1. The pre-heating step $a_1$) can be conveniently carried out in a heat exchanger using a heating fluid at a temperature not higher than 146° C., which is the critical temperature of butene-1. Steam is preferably used as the heating fluid. The heat exchanger is suitably provided with mixing rods inside each tube to increase the overall heat transfer coefficient of the highly viscous polymeric mixture.

Generally, the pre-heating step $a_1$) leads to the formation of liquid and/or gaseous butene-1 and of a polymeric solution having a concentration of PB-1 in butene-1 comprised between 40 and 70% by weight. The product obtained from step $a_1$) is then subjected to a further heating in step $a_2$), such that a two-phase mixture is formed consisting substantially of: (1) a polybutene melt containing entrapped butene-1 and (2) supercritical gaseous butene-1. Step $a_2$) can be carried out in a conventional heat exchanger using a high-temperature diathermic oil as the heating fluid.

Also in this embodiment the final amount of butene-1 entrapped into the polybutene melt is generally less than 10% by weight, preferably less than 6% by wt.

The two-phase mixture coming from step a) (first embodiment) or from step $a_1$)+$a_2$) (second embodiment) is then passed to step b), carried out in a sequence of devolatilization steps operating at decreasing pressures. Preferably step b) comprises two devolatilization chambers or volatilizers connected in series, the first one operating at a pressure higher than the atmospheric pressure, the second one operating under vacuum. This particular plant setup allows a remarkable reduction of the butene-1 content in the final polybutene pellets to be achieved.

The two-phase mixture is introduced at the top of a first empty volatilizer, operated at a temperature of from 170 to 220° C. and at a pressure of from 2 to 12 bar. In said first volatilizer, the components of the mixture formed in step a) are separated by gravity: the polymer melt settles downwards while the supercritical gas flows upward. During the vertical drop of the polymer melt along the chamber a further amount of butene-1 is released away so that at the outlet of the first volatilizer the content of butene-1 in the polybutene melt is generally reduced to less than 3% by weight. The supercritical gas collected at the top of the first volatilizer can contain a little amount of other volatile components, such as inert hydrocarbons, catalyst deactivators, etc so that the monomer recovery requires the separation of said compounds from butene-1. This separation step comprises one or more distillation columns, a drying unit and the recycle of liquid butene-1 to the polymerization section.

The polybutene-1 melt coming out of the first volatilizer is introduced into a second devolatilization chamber, operated in the same range of temperature of the first volatilizer but at a pressure comprised between 5 and 100 mbar. As a consequence of said vacuum conditions a further amount of butene-1 is released away during the drop and settling of the PB-1 melt inside the volatilizer. At the outlet of the second volatilizer the content of butene-1 in the polybutene melt is strongly reduced, obtaining an amount of butene-1 up to less than 100 ppm weight.

Along the line connecting the first volatilizer to the second one, a partial cooling of the polymer melt can occur, so that at the outlet of the first volatilizer the polybutene-1 melt is preferably introduced into a second multi-tube heat exchanger. This heat exchanger has the function of adjusting the temperature of the polymer melt up to the value requested in the second devolatilization chamber.

The obtained polybutene-1 melt is characterized by a very high viscosity, of about $20 \times 10^6$ cP. As a consequence, specific pumps, such as gear pumps, are preferably used to guarantee the extraction of the melt from the bottom of each devolatilization chamber. Preferably, in order to prime the pump a direct coupling of the gear pump to the bottom flange of each volatilizer is provided, so as to convey the PB-1 melt to the successive process steps.

The method of the present invention is characterized by an excellent efficiency in the removal of unreacted butene-1 from butene-1 polymers, so that the following and other advantages can be achieved by the present invention:

the minimization of the butene-1 content at amounts of less than 100 ppm dramatically reduces the problems of explosiveness due to the release of butene-1 incorporated in the final polymer pellets. In fact, a considerable presence of monomer requires a massive and long-period ventilation of the pellets during the storage thereof to reduce the risks of explosiveness: the minimization of butene-1 content at such low values allows to avoid said forced ventilation of the pellets during the storage thereof.

the use of a vented extruder, commonly adopted in some prior art processes, can be avoided, advantageously replaced by a simpler and cheaper apparatus, such as a static mixer.

A static mixer placed downstream the last volatilizer can therefore be used in the process of the present invention to carry out the mixing of the polymer melt with the suitable additives, such as antioxidant compounds, nucleating agents, pigments, etc.

A side-arm extruder is aimed to melt and convey the masterbatch, a pre-compounded concentrate of the final product additives package, into the static mixer wherein an intimate mixing of the additives with the polybutene melt is achieved.

The polymer exiting the static mixer is conveyed to an underwater pelletizer where it is cut into pellets by the action of rotating knife blades: the pellets are then cooled by means of cooling water.

A first embodiment of the method of the invention is described in detail with reference to the accompanying FIG. 1.

A solution of PB-1 in butene-1 coming from the polymerization section is fed via line 1 to a deactivation pot 20 for the deactivation of the catalyst residues. A gear pump 30 is placed on line 2 to introduce the polymer solution into a multi-tube heat exchanger 40 where the heating and mixing conditions of step a) of the present invention are carried out. The heat exchanger 40 contains mixing rods inserted inside each tube. As above specified, a polymeric solution having a temperature 65–85° C. is fed to the inlet of said heat exchanger 40, while the inlet pressure is preferably set in the range of from 25 to 80 bar. At the outlet of said heat exchanger 40, the temperature is set in the range of from 170 to 220° C., while the pressure is comprised between 2 and 12 bar.

A two-phase mixture consisting substantially of (1) a polybutene melt containing entrapped butene-1 and (2) supercritical gaseous butene-1 is obtained at the outlet of the heat exchanger 40, passed via line 3 to a first devolatilization chamber 50.

The two components of the mixture are separated by gravity into the volatilizer 50: the polymer melt pours downwards and collects at the bottom of said volatilizer, while the supercritical gaseous monomer flows upward. The gas collected at the top of the volatilizer 50 is passed via line 4 to the monomer recovery section and then returned as liquid butene-1 to the polymerization section via line 5.

The polybutene-1 melt is withdrawn by means of a gear pump 60 from the bottom of the first volatilizer 50 and introduced into a second multi-tube heat exchanger 70 via line 6. Afterwards, the PB-1 melt is fed at the top of a second volatilizer 80 in which vacuum conditions are generated by means of a vacuum pump 120 placed on line 7. The gaseous butene-1 collected at the top of said second volatilizer 80 is sent via line 7 to the recovery section. The polybutene-1 melt withdrawn by means of a gear pump 90 from the bottom of the second volatilizer 80 is introduced into a static mixer 100 via line 10. A side-arm extruder 110 is used for melting and mixing the additives used for the compounding of the polymer; said additives being fed through line 8 to the side-arm extruder 110. Said masterbatch is fed to the inlet of the static mixer 100 via line 9. The additived polymer melt exiting the static mixer 100 is then passed via line 11 to an underwater pelletization step where it is cut into pellets.

A second embodiment of the method of the invention is described in detail with reference to the accompanying FIG. 2.

Figure 2:
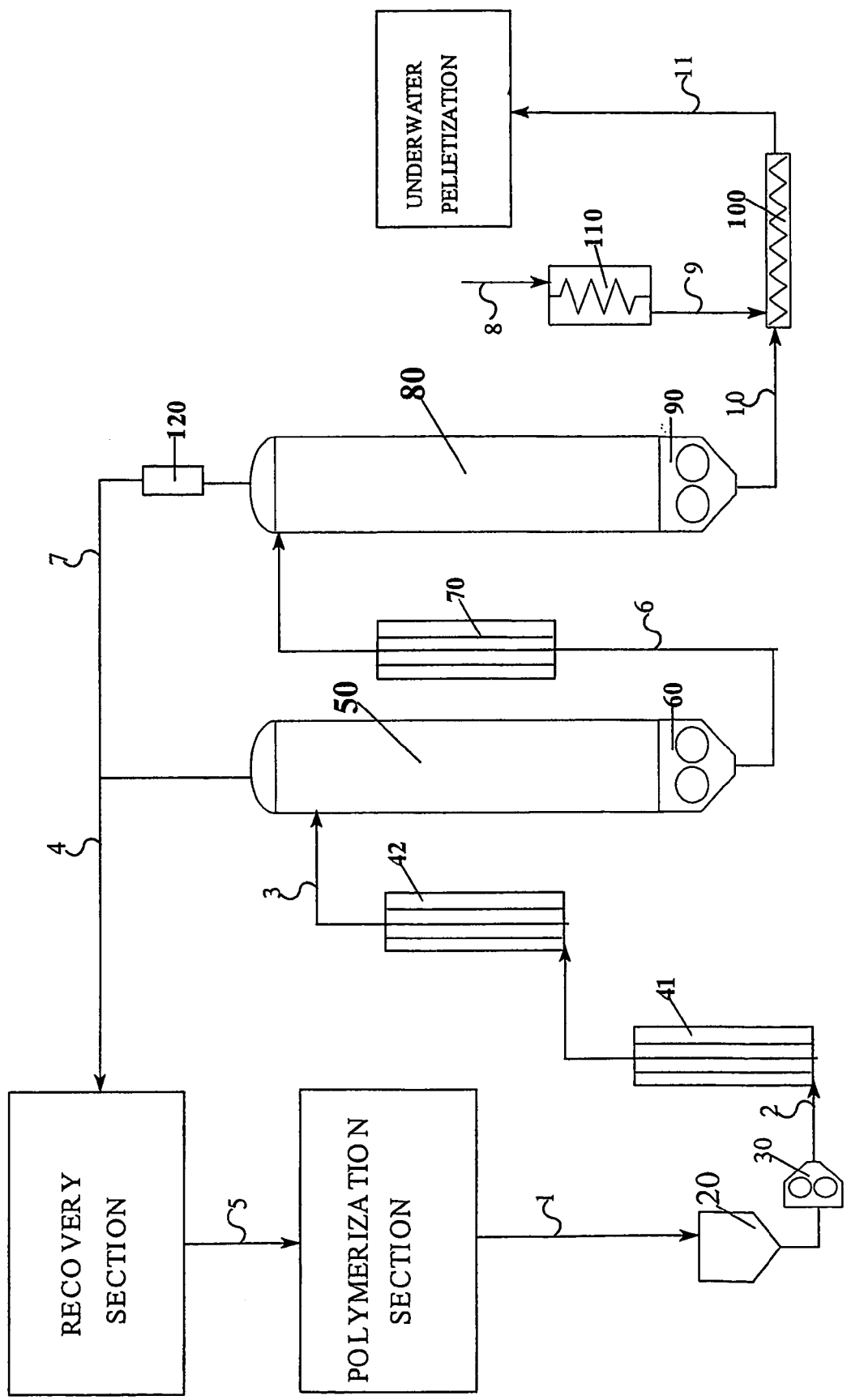
FIG. 2 is a process flow diagram of a process for removing volatile components from polymer compositions with two heating steps before the first devolatilization chamber.

According to the embodiment of FIG. 2, after the killing of the catalyst residues in the deactivation pot 20, the polymeric solution of PB-1 in butene-1 is fed to a first heat exchanger 41. Inside the tubes of the heat exchanger 41 the polymeric solution is subjected to heating and mixing conditions (step $a_1$) to cause part of the butene-1 to separate from the solution. Steam is used as the heating fluid at a temperature not exceeding 146° C., which the critical temperature of butene-1. The heat exchanger 41 is provided with mixing rods inside each tube to increase the overall heat transfer coefficient of the highly viscous polymeric mixture.

The product obtained at the outlet of the heat exchanger 41 comprises liquid and/or gaseous butene-1 and a polymeric solution having a concentration of PB-1 in butene-1 comprised between 40 and 70% by weight. The product coming from the heat exchanger 41 is then subjected to a further heating (step $a_2$) in a second heat exchanger 42 using a high-temperature diathermic oil as the heating fluid. At the outlet of the second heat exchanger 42 a mixture consisting of (1) a polybutene melt containing entrapped butene-1 and (2) supercritical gaseous butene-1 is obtained. Said to two-phase mixture is passed via line 3 to the first devolatilization chamber 50 and then subjected to the same process conditions in the same equipment as in FIG. 1.

As said, the method of the present invention is suitable for the removal of volatile components contained in a polymeric solution obtained by a liquid-phase process for homo- or copolymerizing butene-1.

It is therefore a further object of the present invention a process for obtaining butene-1 (co)polymers comprising the following steps:
 (co)polymerizing butene-1 in liquid phase in the presence of a catalyst system based on a transition metal compound to obtain a solution of polybutene-1 in butene-1;
 removing the unreacted butene-1, optionally together with other volatile components, from said solution according to the method above described.

Preferably a Ziegler-Natta catalyst comprising a Ti-based compound as the solid catalyst component and an aluminum alkyl compound as an activator is used as catalyst system for the liquid-phase (co)polymerization of butene-1.

The following examples have to be considered representative and non-limiting of the scope of the invention.

EXAMPLES

The following examples relate to some tests carried out in a pilot plant and aimed at evaluating the effectiveness of the claimed method to remove continuously unreacted butene-1 from a solution of polybutene-1 (PB-1) in butene-1.

The polymer solution was obtained by a liquid-phase polymerization carried out into two continuously stirred tank reactors having a volume of 0.33 m³. Liquid butene-1 was used as the reaction medium and the polymerization conditions were selected as follows: T=75° C., p=18 bar.

Example 1

A highly-viscous solution of a butene-1 homopolymer in butene-1 with a polymer concentration of 25% by wt and a polymer melt index of 0.40 (Condition E, 190° C./2.16 Kg) was treated according to the embodiment of FIG. 1 of the present invention.

170 Kg/h of the above polymeric solution were discharged from the polymerization reactor, subjected to catalyst deactivation in the deactivation pot 20, before to be fed to a gear pump 30 to increase its pressure to a value of 30 bar. Then, the solution of PB-1 in butene-1 was subjected to heating and mixing conditions according to step a) of the invention by flowing it through a multi-tube heat exchanger 40 having a length of 1.2 m, provided with 60 tubes having an internal diameter of 20 mm. Mixing rods were used as mixing elements inside each tube.

The operative conditions at the inlet of the multi-tube heat exchanger 40 were the following: T=75° C., p=30 bar.

A diathermic oil (MARLOTHERM N) was fed at 260° C. into the heat exchanger 40 as a heating fluid. At the outlet of the heat exchanger a mixture was obtained consisting of: (1) a polybutene-1 melt containing 3.6% by weight of butene-1 and (2) gaseous butene-1. The operative conditions at the outlet of the multi-tube heat exchanger 40 were the following: T=210° C., p=7 bar.

The same operative conditions (T=210° C., p=7 bar) were adopted in the first devolatilization chamber 50 in which the above mixture was introduced. Due to gravity, the polybutene melt settled at the bottom of the chamber, while the gaseous butene-1 flowed upward. At the outlet of the volatilizer 50 the content of butene-1 in the polybutene melt was checked: a value of 1.9% by weight was measured.

The PB-1 melt was withdrawn from the bottom of the volatilizer 50 by means of a gear pump 60 and then introduced into a second multi-tube heat exchanger 70 where the polymer melt was heated up to the temperature requested into the second devolatilization chamber 80.

The second devolatilization chamber 80 was operated under vacuum at 210° C. and 25 mbar. At the outlet of the second volatilizer 80 the content of monomer in the polybutene melt was measured obtaining a value of only 67 ppm weight.

A static mixer 100 placed downstream the second devolatilization chamber 80 was used for mixing the polymer melt with Irganox 1010 as an antioxidant compound, talc as a nucleating agent, carbon black and $TiO_2$ as pigments. A side-arm extruder 110 was used to melt and convey the additives into the static mixer 100. Finally, the additivated polybutene melt exiting the static mixer 100 was conveyed to an underwater pelletizer to be cut into pellets.

Example 2

A solution of a butene-1 random copolymer (containing 5.8% by wt of ethylene) having a polymer concentration of 25% by wt and a melt index MIE of 2.2 was treated according to the present invention.

170 Kg/h of the above polymeric solution were discharged from the polymerization reactor, subjected to catalyst deactivation in the deactivation pot 20, before to be fed to a gear pump 30 to increase its pressure to a value of 27 bar. Then, the solution of PB-1 in butene-1 was passed through the multi-tube heat exchanger 40. The operative conditions at the inlet of the multi-tube heat exchanger 40 were the following: T=75° C., p=27 bar.

At the outlet of the heat exchanger 40 a mixture was obtained consisting of: (1) a polybutene-1 melt containing 3.8% by weight of butene-1 and (2) gaseous butene-1. The operative conditions at the outlet of the multi-tube heat exchanger were the following: T=190° C., p=6 bar. The same operative conditions of temperature and pressure were adopted in the first devolatilization chamber 50 wherein the above mixture was introduced: due to gravity, the polybutene melt settled at the bottom of the chamber 50, while the gaseous butene-1 flowed upward. At the outlet of the volatilizer 50 the content of butene-1 in the polybutene melt was checked: a value of 1.9% by weight was measured. The PB-1 melt was withdrawn from the bottom of the volatilizer 50 by means of a gear pump 60 and then introduced into a second multi-tube heat exchanger 70 wherein the polymer melt was heated up to the temperature requested into the second devolatilization chamber 80.

The second devolatilization chamber 80 was operated under vacuum at 190° C. and 20 mbar. At the outlet of the second volatilizer 80 the content of monomer in the polybutene melt was measured obtaining a value of only 64 ppm weight.

The polybutene-1 melt was compounded into a static mixer 100 as in example 1. Finally, the additivated polybutene melt was conveyed to an underwater pelletizer to be cut into pellets.

Example 3

A solution of a butene-1 homopolymer in butene-1 having a concentration of 30% by wt and a melt index MIE of 20.0 was treated according to the present invention.

170 Kg/h of the above polymeric solution were discharged from the polymerization reactor, subjected to catalyst deactivation in the deactivation pot 20, before to be fed to a gear pump 30 in order to increase its pressure to a value of 25 bar. Then, the solution of PB-1 in butene-1 was passed through the multi-tube heat exchanger 40. The operative conditions at the inlet of the multi-tube heat exchanger 40 were the following: T=75° C., p=25 bar.

At the outlet of the heat exchanger 40 a mixture was obtained consisting of: (1) a polybutene-1 melt containing 3.5% by weight of butene-1 and (2) gaseous butene-1.

The operative conditions at the outlet of the multi-tube heat exchanger were the following: T=180° C., p=5 bar. The same operative conditions of temperature and pressure were adopted in the devolatilization chamber 50, wherein the above mixture was introduced: due to gravity, the polybutene melt settled at the bottom of the chamber, while the gaseous butene-1 flowed upward. At the outlet of the volatilizer 50 the content of butene-1 in the polybutene melt was checked: a value of 1.7% by weight was measured.

The PB-1 melt was withdrawn from the bottom of the volatilizer 50 by means of a gear pump 60 and then introduced into a second multi-tube heat exchanger 70 where the polymer melt was heated up to the temperature requested into the second devolatilization chamber 80.

The second devolatilization chamber 80 was operated under vacuum at 180° C. and 10 mbar. At the outlet of the second volatilizer 80 the content of monomer in the polybutene melt was measured obtaining a value of only 35 ppm weight.

The polybutene-1 melt was compounded in a static mixer 100 as in example 1. Finally, the additivated polybutene-1 melt was conveyed to an underwater pelletizer to be cut into pellets.

Example 4

The same solution of butene-1 homopolymer in butene-1 of example 1 (polymer concentration 25% by wt, melt index of 0.40) was passed through a gear pump 30 in order to increase its pressure to a value of 30 bar. Then, the solution of PB-1 in butene-1 was passed through the multi-tube heat exchanger 40. The operative conditions at the inlet of the multi-tube heat exchanger 40 were the following: T=75° C., p=30 bar.

At the outlet of the heat exchanger 40 a mixture was obtained consisting of: (1) a polybutene-1 melt containing 3.8% by weight of butene-1 and (2) gaseous butene-1.

The operative conditions at the outlet of the multi-tube heat exchanger 40 were the following: T=210° C., p=7.0 bar. The same operative conditions were adopted in the first devolatilization chamber 50 wherein the above mixture was introduced: the polybutene melt was collected at the bottom of the chamber, while the gaseous butene-1 flowed upward. At the outlet of the volatilizer 50 the content of butene-1 in the polybutene melt was checked: a value of 1.9% by weight was measured.

The second devolatilization chamber 80 was operated under vacuum at 210° C. and 200 mbar. At the outlet of the second volatilizer 80 the content of monomer in the polybutene melt was measured obtaining a value of 540 ppm weight.

Example 5 (Comp.)

The same solution of polybutene-1 in butene-1 of the example 1 (polymer concentration 25% by wt, melt index of 0.40) was introduced into the multi-tube heat exchanger 40 using the same diathermic oil of example 1 at the same feeding temperature. The following conditions: T=75° C. and p=18 bar were set at the inlet of the heat exchanger 40.

It was observed an unstable working of the heat exchanger 40 due to uncontrolled and unexpected fluctuations of temperature and pressure. The separation inside the apparatus of a partially-solid polymer, in addition to the two-phase mixture (PB-1 melt and gaseous butene-1), interfered with the flowability of the two-phase mixture. The formation of cold spots was so remarkable that at the outlet of the heat exchanger 40 the obtained mixture was not homogeneous as regards concentration, temperature and pressure.

Example 6 (Comp.)

The same solution of polybutene-1 in butene-1 of the example 3 (polymer concentration 30% by wt, melt index of 20.0) was passed through the gear pump 30 in order to increase its pressure to a value of 25 bar. Then, the solution of PB-1 in butene-1 was passed through the multi-tube heat exchanger 40. The operative conditions at the inlet of the multi-tube heat exchanger 40 were the following: T=75° C., p=25 bar.

At the outlet of the heat exchanger 40 a mixture was obtained consisting of: (1) a polybutene-1 melt containing 4.2% by weight of butene-1 and (2) supercritical gaseous butene-1.

The operative conditions at the outlet of the multi-tube heat exchanger 40 were set as follows: T=160° C., p=5 bar. With said temperature and pressure the mixture was introduced into the volatilizer 50. Due to the excessive viscosity of the polymer melt separated at the bottom of the volatilzer 50, it was not possible to prime the gear pump 60 and to transfer the polymer melt to the successive steps.

This example proves that when step b) is carried out at a temperature under the claimed range, the method of the invention is not feasible.

Example 7

A solution of a butene-1 homopolymer in butene-1 with a polymer concentration of 25% by wt and a polymer melt index MIE of 0.40 was treated according to the embodiment of FIG. 2 of the present invention.

170 Kg/h of the above polymeric solution were discharged from the polymerization reactor, subjected to catalyst deactivation in the deactivation pot 20, and then passed through the gear pump 30 to increase its pressure to a value of 30 bar.

The solution of PB-1 in butene-1 was subjected to heating and mixing conditions according to step $a_1$) of the invention by flowing it through a multi-tube heat exchanger 41 having a length of 6 m, provided with 8 tubes having an internal diameter of 21 mm. Mixing rods were used as mixing elements inside each tube and steam at a temperature of 135° C. was used as the heating fluid. The operative conditions at the inlet of the multi-tube heat exchanger 41 were the following: T=75° C., p=30 bar.

The product obtained at the outlet of the heat exchanger 41 was substantially consisting of liquid butene-1 and a polymeric solution of PB-1 in butene-1 with a polymer concentration of 50% by wt. The temperature at the outlet of step a1) was of about 110° C.

The product coming from the heat exchanger 41 was then subjected to a further heating (step $a_2$) in a second heat exchanger 42 having a length of 4.5 m, provided with 31 tubes having an internal diameter of 21 mm. A diathermic oil (MARLOTHERM N) was fed at 260° C. into the heat exchanger 42 as a heating fluid. At the outlet of said heat exchanger a mixture was obtained consisting of: (1) a polybutene-1 melt containing 3.0% by weight of butene-1 and (2) gaseous butene-1. The operative conditions at the outlet of the multi-tube heat exchanger 42 were the following: T=210° C., p=7 bar.

The same operative conditions (T=210° C., p=7 bar) were adopted in the first devolatilization chamber 50 in which the above mixture was introduced. Due to gravity, the polybutene melt settled at the bottom of the chamber, while the gaseous butene-1 flowed upward. At the outlet of the volatilizer 50 the content of butene-1 in the polybutene melt was checked: a value of 1.9% by weight was measured.

The PB-1 melt was withdrawn from the bottom of the volatilizer 50 by means of a gear pump 60 and then introduced into a second multi-tube heat exchanger 70 where the polymer melt was heated up to the temperature requested into the second devolatilization chamber 80.

The second devolatilization chamber 80 was operated under vacuum at 210° C. and 25 mbar. At the outlet of the second volatilizer 80 the content of monomer in the polybutene melt was measured obtaining a value of only 40 ppm weight.

The polybutene-1 melt was compounded in a static mixer 100 as in example 1. Finally, the additivated polybutene-1 melt was conveyed to an underwater pelletizer to be cut into pellets.

The invention claimed is:

1. A method for continuously removing unreacted butene-1 and optionally other volatile components from a polymeric solution produced by liquid phase (co)polymerization of butene-1, the method comprising the steps of:
    a) subjecting the polymeric solution to heating and mixing conditions such that a mixture is formed consisting essentially of: (1) a polybutene melt containing entrapped butene-1 and (2) supercritical gaseous butene-1; and
    b) subjecting the mixture of step a) to a sequence of devolatilization steps operating at decreasing pressures and at temperatures comprised between 170 and 220° C.

2. The method according to claim 1, wherein the other volatile components are comonomers, dimers, inert hydrocarbons, catalyst components and catalyst deactivators.

3. The method according to claim 1, wherein the polymeric solution obtained by liquid phase (co)polymerization of butene-1 is a solution of polybutene-1 in butene-1 containing unreacted butene-1 in a percentage comprised between 65 and 90% by weight.

4. The method according to claim 1, wherein the polymeric solution is fed to step a) at a temperature of 65–85° C.

5. The method according to claim 1, wherein the polymeric solution is fed to step a) at a pressure of at least 22 bar.

6. The method according to claim 5, wherein the polymeric solution is fed to step a) at a pressure in the range of from 25 to 80 bar.

7. The method according to claim 1, wherein the heating and mixing conditions of step a) are produced by flowing the solution of polybutene in butene-1 through a multi-tube heat exchanger having static mixing elements inserted inside each tube.

8. The method according to claim 7, wherein said static mixing elements are mixing rods.

9. A method for continuously removing unreacted monomer and optionally other volatile components from a polymeric solution produced by a liquid-phase (co)polymerization of butene-1, the method comprising the steps of:
   $a_1$) subjecting the polymeric solution to heating and mixing conditions so as to cause part of the butene-1 to separate from the solution, thereby forming a product of step $a_1$;
   $a_2$) subjecting the product of step $a_1$) to a further heating such that a two-phase mixture is formed consisting essentially of: (1) a polybutene melt containing entrapped butene-1 and (2) supercritical gaseous butene-1; and
   b) subjecting the two-phase mixture of step $a_2$ to a sequence of devolatilization steps operating at decreasing pressures and at temperatures comprised between 170 and 220° C.

10. The method according to claim 9, wherein step $a_1$) is carried out in a heat exchanger using a heating fluid at a temperature not higher than 146° C.

11. The method according to claim 9, wherein the product of step $a_1$) comprises a liquid and/or gaseous butene-1 and a polymeric solution having a concentration of PB-1 in butene-1 comprised between 40 and 70% by weight.

12. The method according to claim 9, wherein step $a_2$) is carried out in a heat exchanger using a high-temperature diathermic oil as a heating fluid.

13. The method according to claim 1, wherein the amount of butene-1 entrapped into the polybutene melt is less than 10% by weight.

14. The method according to claim 13, wherein the amount of butene-1 entrapped into the polybutene melt is less than 6% by weight.

15. The method according to claim 1, wherein step b) comprises devolatilization in a first volatilizer and a second volatilizer connected in series, the first volatilizer operating at a pressure higher than the atmospheric pressure, the second volatilizer operating under vacuum.

16. The method according to claim 15, wherein the first volatilizer is operated at a temperature of from 170 to 220° C. at a pressure of from 2 to 12 bar.

17. The method according to claim 15, wherein at an outlet of the first volatilizer the content of butene-1 in the polybutene melt is reduced to less than 3% by weight.

18. The method according to claim 15, wherein a polybutene melt coming from the first volatilizer is introduced into the second volatilizer operated at a temperature of from 170 to 220° C. at a pressure of from 5 to 100 mbar.

19. The method according to claim 15, wherein at an outlet of the second volatilizer the content of butene-1 in the polybutene melt is reduced to less than 100 ppm.

20. The method according to claim 15, wherein the polybutene melt is compounded in a static mixer after devolatilization in the second volatilizer.

21. A process for obtaining butene-1 (co)polymers comprising the following steps:
   a) (co)polymerizing butene-1 in liquid phase in the presence of a catalyst system based on a transition metal compound to obtain a solution of polybutene-1 in butene-1;
   b) removing an amount of unreacted butene-1, optionally together with other volatile components, from said solution by
      (I) subjecting the solution to heating and mixing conditions such that a mixture is formed consisting essentially of: (1) a polybutene melt containing entrapped butene-1 and (2) a supercritical gaseous butene-1;
      (II) subjecting the mixture of step (I) to a sequence of devolatilization steps operating at decreasing pressures and at temperatures comprised between 170 and 220° C.

22. The method according to claim 9, wherein the amount of butene-1 entrapped into the polybutene melt is less than 10% by weight.

23. The method according to claim 22, wherein the amount of butene-1 entrapped into the polybutene melt is less than 6% by weight.

24. The method according to claim 9, wherein step b) comprises devolatilization in a first volatilizer and a second volatilizer connected in series, the first volatilizer operating at a pressure higher than the atmospheric pressure, the second volatilizer operating under vacuum.

25. The method according to claim 24, wherein the first volatilizer is operated at a temperature of from 170 to 220° C. at a pressure of from 2 to 12 bar.

26. The method according to claim 24, wherein at an outlet of the first volatilizer the content of butene-1 in the polybutene melt is reduced to less than 3% by weight.

27. The method according to claim 24, wherein a polybutene melt coming from the first volatilizer is introduced into the second volatilizer operated at a temperature of from 170 to 220° C. at a pressure of from 5 to 100 mbar.

28. The method according to claim 24, wherein at an outlet of the second volatilizer the content of butene-1 in the polybutene melt is reduced to less than 100 ppm.

29. The method according to claim 24, wherein the polybutene melt is compounded in a static mixer after devolatilization in the second volatilizer.

* * * * *